UNITED STATES PATENT OFFICE.

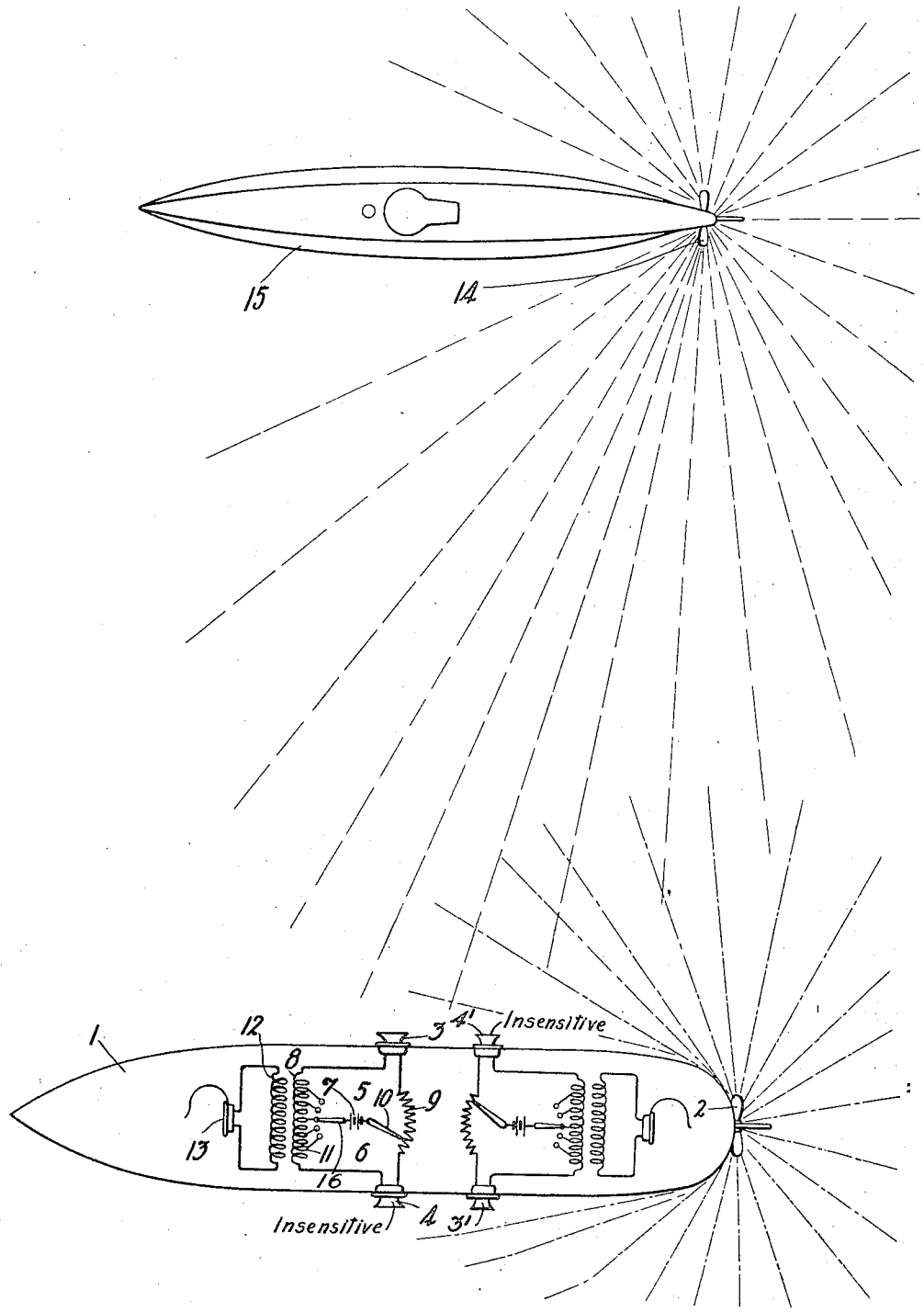

CHARLES E. SCRIBNER, OF JERICHO, VERMONT, AND JAMES L. McQUARRIE, OF MONTCLAIR, NEW JERSEY, ASSIGNORS TO WESTERN ELECTRIC COMPANY, INCORPORATED, OF NEW YORK, N. Y., A CORPORATION OF NEW YORK.

SIGNALING SYSTEM.

1,312,809.  Specification of Letters Patent.  Patented Aug. 12, 1919.

Application filed June 8, 1917. Serial No. 173,540.

*To all whom it may concern:*

Be it known that we, CHARLES E. SCRIBNER and JAMES L. McQUARRIE, citizens of the United States, residing at Jericho, in the county of Chittenden and State of Vermont, and at Montclair, in the county of Essex and State of New Jersey, respectively, have invented certain new and useful Improvements in Signaling Systems, of which the following is a full, clear, concise, and exact description.

This invention relates to a signaling system and more particularly to a submarine signaling system employed to detect the presence of nearby vessels. Such systems have been provided in which the exploring vessel, such as a submarine boat, has mounted in the side thereof a sound detector which receives sound waves propagated through the water from the propeller of the vessel whose presence it is desired to detect. Previous signaling systems of this sort are open to the objection that while the sound detector is responsive to the propeller of a distant vessel, it is responsive to a much greater degree to the noise produced by the vessel on which the signaling system is provided. The local propeller thus produces an objectionable noise which interferes with the detection of the sound from a distant vessel.

This objection is overcome according to the present invention by providing two detectors, one of which is relatively insensitive and both of which are differentially related to a common telephone receiver. This makes it possible to balance out the noise due to the local propeller, whereas the distant propeller affects the sensitive detector more than the insensitive detector and produces a resultant effect in the telephone receiver.

In order to determine whether the distant vessel is on the starboard or on the port side of the exploring vessel the latter may be provided with two such detecting systems, providing a sensitive detector in each side of the vessel. A telephone receiver is associated, as described above, with each sensitive detector so that the response of one of these receivers indicates on which side of the exploring vessel the distant vessel is located.

For further details of the invention reference may be made to the drawings in which the figure shows diagrammatically one form of signaling system that may be used.

In the figure, the vessel 1, which may be a submarine, is provided with the usual propeller 2, the noise from which it is desired to eliminate in the signaling system used on this vessel. On each side of this vessel is provided a detector such as 3 and 4, one of which, 4 for instance, is relatively insensitive. These detectors may be ordinary microphonic transmitters and are supplied with current through parallel paths 5 and 6 from the common battery 7. The current path 5 includes the primary coil 8 and that portion of resistance 9 which is included between the transmitter 3 and the adjustable contact arm 10 located between the resistance 9 and the battery 7. The current path 6 includes the remaining portion of resistance 9 and the primary coil 11. The number of turns in each of the coils 8 and 11 may be adjusted by the contact arm 16. The coils 8 and 11 are differentially related with respect to the secondary coil 12, in circuit with which is a telephone receiver 13. The arms 10 and 16 are so adjusted that the noise due to the propeller 2 is balanced out in the receiver 13. The propeller 14 of a distant vessel such as a submarine 15, however, will produce a greater effect on the transmitter 3 than on the insensitive transmitter 4, thereby producing a resultant effect in the receiver 13.

As shown in the drawing another detecting system may be provided similar to the one above described except that the positions of the sensitive and insensitive detectors are reversed. This arrangement provides a sensitive detector 3 and 3' at each side of the vessel.

While the transmitters 3 and 4 and likewise 3' and 4' are shown as being located on opposite sides of the vessel, other arrangements may be provided, the only essential being that the relation of the transmitters to the local propeller is such that the propeller noise is eliminated in the receiver.

What is claimed is:

1. A signaling system comprising a plurality of unequally sensitive sound detectors, a receiver, and means for differentially relating said detectors to said receiver.

2. A signaling system comprising a source of current, a plurality of current paths connected in parallel to said source, a transmitter included in one of said paths, a second transmitter included in the other of said paths, and a receiver, said transmitters being unequally sensitive and differentially related to said receiver.

3. In a submarine signaling system, the combination of a vessel having a propeller, a plurality of detectors and a receiver associated with said vessel, each of said detectors being responsive to the sound produced by said propeller, means for associating said detectors with said receiver whereby the noise due to said propeller is eliminated, said receiver being responsive to a distant disturbance.

4. A submarine signaling system according to claim 3 in which said detectors are differentially related with respect to said receiver.

5. A submarine signaling system according to claim 3 in which said detectors are located on opposite sides of said vessel.

6. A submarine signaling system according to claim 3 in which one of said detectors is relatively insensitive.

7. A submarine signaling system according to claims 3, 4, 5 and 6 in which said detectors are included in parallel paths, and a source of current in common to said paths.

8. A submarine signaling system according to claims 3, 4, 5, 6 and 7 in which one of said paths comprises a portion of a resistance, the other of said paths comprises the remaining portion of said resistance, and an adjustable connection from said source to said resistance.

9. Two submarine signaling systems according to claim 6 in which a sensitive detector is provided at each side of said vessel.

In witness whereof, we hereunto subscribe our names this 6th day of June, A. D. 1917.

CHARLES E. SCRIBNER.
JAMES L. McQUARRIE.